United States Patent

Wheeler et al.

[11] Patent Number: 5,257,463
[45] Date of Patent: Nov. 2, 1993

[54] METHOD AND APPARATUS FOR COOLING OR HEATING BATTERY CELLS DURING ELECTRICAL TESTING

[75] Inventors: James R. Wheeler, Joplin, Mo.; Steven L. Girard, Pittsburg, Kans.; Randal C. Richardson, Joplin, Mo.

[73] Assignee: Eagle-Picher Industries, Inc., Cincinnati, Ohio

[21] Appl. No.: 878,628

[22] Filed: May 5, 1992

[51] Int. Cl.[5] .............................................. F26B 7/00
[52] U.S. Cl. ........................................ 34/20; 34/231; 165/80.2; 165/80.3
[58] Field of Search ...................... 34/22, 23, 20, 104, 34/34, 231, 210, 213, 214; 429/62; 165/58, 80.1, 80.2, 80.3

[56] References Cited

U.S. PATENT DOCUMENTS 3,413,728 12/1968 Tigel et al. .............................. 34/22

OTHER PUBLICATIONS

Eagle-Picher Industries-Room Temperature Test Rack, Photo #1.
Standard Battery Cooling Box, Photo #2.
Eagle-Picher Industries-Battery Cells Mounted to a Fixture in a Refrigerator, Photo #3 and Photo #4.
Eagle-Picher Industries-Standard Battery Cell Cooling Cart, Photo #5 and Photo #6.
Lockheed Missile and Space Company-Modified Bemco Temperature Chamber (abstract).

*Primary Examiner*—Henry A. Bennet
*Attorney, Agent, or Firm*—Wood, Herron & Evans

[57] ABSTRACT

A method and apparatus for uniformly cooling or heating a plurality of test battery cells to a desired temperature having a housing with a first chamber and a second chamber separated by a bulkhead. A plurality of individual battery cell recepticles, such as sleeves, are mounted on the bulkhead. Each sleeve receives at least one battery cell and is sized to allow easy insertion and removal of the battery cell from the sleeve, helping to speed up testing. A uniform space is maintained between the battery cell inserted into the sleeve and the inner surface of the sleeve. A gas, such as air, is either cooled or heated, depending upon the desired temperature, and continuously circulated around the surface of the battery cell within the sleeve. The present invention enables a relatively large number of battery cells to be cooled or heated to a desired temperature and electrically tested quickly and with accurate results.

20 Claims, 2 Drawing Sheets

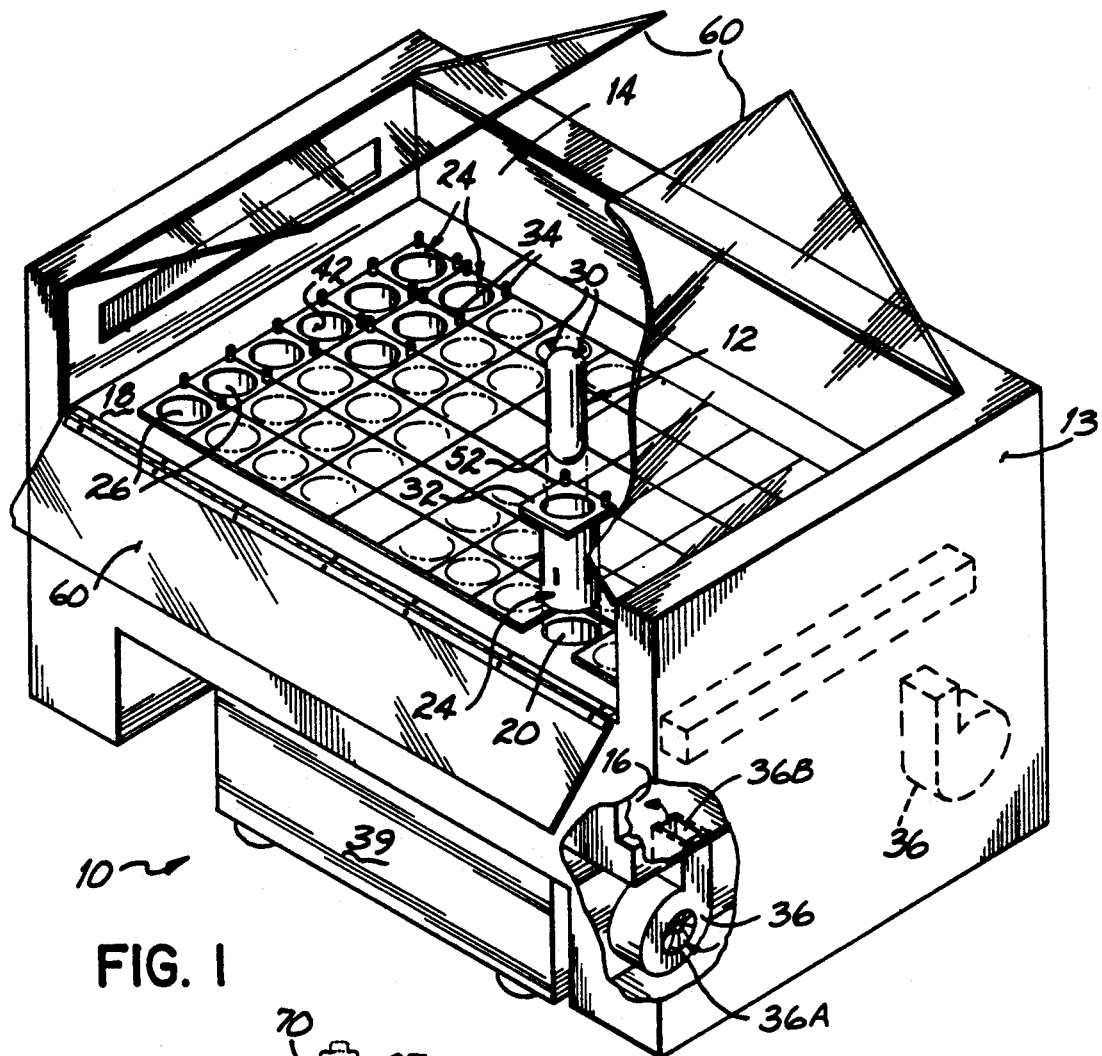
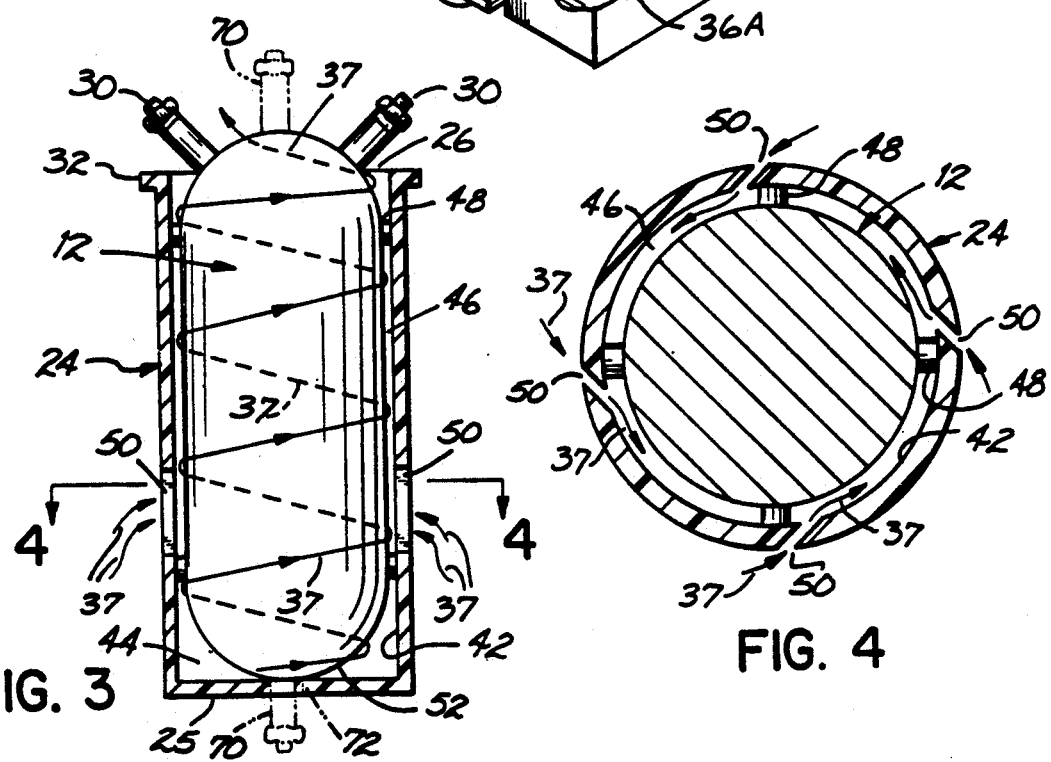

METHOD AND APPARATUS FOR COOLING OR HEATING BATTERY CELLS DURING ELECTRICAL TESTING

FIELD OF THE INVENTION

This invention relates to a method and apparatus for heating or cooling a battery cell while electrically testing it.

BACKGROUND OF THE INVENTION

Battery cells are not always used at room temperature. For example, battery cells used in communication satellites are after exposed to temperatures ranging from about 20° C. to 0° C. The internal temperature of a battery cell can have a pronounced effect on its performance. Thus, many battery cells which are exposed to temperature extremes in use must be tested at those temperatures in order to predict accurately whether they will perform adequately.

The temperature of some battery cells can also change markedly during electrical cycles of charging and discharging.

Nickel-hydrogen (pressure vessel) battery cells, which are used in satellites, behave in this manner. When the temperature of such battery cells exceeds about 20° C., their efficiency begins to drop rapidly. Apparatus used to test such battery cells at simulated use temperatures must also be able to eliminate the effects of heat generated by the battery cell during testing, in order to ensure the accuracy of the performance predictions.

A battery cell can be distinguished from a battery in that a battery cell has an inherent voltage which is independent of cell size and is determined only by the chemical nature of its components, less resistive current losses. A battery on the other hand is always composed of two or more battery cells. The life of a group of interconnected battery cells can depend, among other things, on uniformity of the capacity of each. To ensure that battery cells in such installations are evenly matched, the performance of each battery cell needs to be accurately known in advance. The accuracy of such performance predictions can be critical in some applications. For example, the battery cells used in a communication satellite are expected to have a life while in orbit of 15 years or more. The accuracy of predicting the functional life of a satellite can be critical, one reason being the great expense incurred in placing the satellite into space. Therefore, battery cells like these are typically 100% tested (i.e. each battery cell is tested) at the temperature desired, rather than lot or sample tested. To reduce the costs of such testing, the apparatus used to test battery cells 100%, or in relatively large quantities, should be structured to enable the battery cells to be quickly mounted, tested and removed.

A number of devices have been developed to heat or cool battery cells during use or testing. One device employs radiative and conductive cooling by means of a close-fitting, chilled metallic test block surrounding the battery cell. However, it is difficult and time consuming to establish uniform conductive contact for a large group of battery cells with such a close-fitting test block. Such metal test blocks are commonly used in the aerospace battery cell industry to test battery cells like nickel-hydrogen battery cells which are typically housed in a cylindrical pressure vessel having hemispherical ends. When such a battery cell is tested in a metal test block, heat transfer and the speed of testing is impeded even more by a dielectric wrap which is used to prevent shorting of the pressure vessel, through which the heat must pass. In addition, chilled air in the test fixture naturally falls in a gravity environment to the base of the battery cell, making the lower end considerably colder than the upper end. This is an undesirable condition.

Another common method for testing a battery cell at a particular temperature involves cooling the battery cell through a thermal sleeve which is attached to the battery cell with a thin layer of insulating material such as a rubber. The sleeve/battery cell assembly is then affixed to a chilled metallic base plate. However, this apparatus, which requires a chilled base plate made to fit the sleeve, is expensive to make and slow to use. In addition, it is often impractical to mass test battery cells with such apparatus because the test sleeves are difficult to remove.

SUMMARY OF THE INVENTION

Uniformly cooling or heating test battery cells to a desired temperature improves the accuracy of tests conducted to predict end use performance. For example, non-uniform cooling (i.e., the formation of cold spots) on some battery cells, like nickel-hydrogen battery cells, can cause the maldistribution of electrolyte within the battery cell and thereby shorten the life of the battery cell. Maintaining a uniform temperature over the surface of the battery cell can minimize the affect of temperature as a variable in predicting battery cell performance.

It has been an objective of the present invention to provide a method and apparatus for uniformly heating or cooling a number of battery cells to a desired temperature level and for uniformly maintaining that temperature during electrical testing, especially during cyclic charging and discharge testing. While this application primarily describes an apparatus for low temperature testing, the present invention is not limited to cooling battery cells during electrical testing, but may also be used when testing under high temperatures is desired.

Another objective of the present invention is to provide such an apparatus which inexpensively enables a relatively large number of battery cells to be quickly mounted, simultaneously tested at the desired temperature and quickly removed.

An additional objective of the present invention is to provide such an apparatus which can accommodate various sizes and quantities of battery cells with only minor, if any, modifications to the apparatus.

These objectives of the present invention are obtained by providing a housing having a first chamber and a second chamber separated by a partition or bulkhead. A plurality of individual battery cell receptacles, such as sleeves, are mounted on the bulkhead. Each sleeve receives at least one battery cell and is sized to allow easy insertion and removal of the battery cell from the sleeve, which helps to speed up testing. Each sleeve is also constructed to maintain a uniform space between the battery cell inserted into the sleeve and the inner surface of the sleeve. A gas (typically but not necessarily air) which is either cooled or heated, depending upon the temperature change desired, is continuously circulated around the surface of the battery cell within the sleeve. The gas is not directed perpendicularly against the battery cell surface. Keeping a continuous flow of the gas circulating around the surface of the battery cell helps to ensure a uniform battery cell temperature. Cold or hot spots are eliminated or significantly reduced by preventing the gas from striking the battery cell perpendicularly. Thus, the present invention enables a relatively large number of battery cells to be cooled or heated to a desired temperature and electrically tested quickly and with accurate results.

Preferably, for better thermal exchange, the gas should be circulated in a spiral movement laterally around the battery cell, which increases the amount of battery cell surface contacted per unit time by the gas. In order to accomplish this lateral spiral movement and prevent or reduce cold or hot spots, gas inlet holes or slots are preferably formed through the side walls of each sleeve at a lateral slant of less than 90°, relative to the surface of the battery cell.

These and other objectives and advantages of the present invention shall become more readily apparent from the following detailed description taken in conjunction with the drawings herein, in which:

BRIEF DESCRIPTION OF THE DRAWINGS

FIG. 1 is an exploded perspective view partly broken away, of a test fixture according to a preferred embodiment of the present invention for cooling a plurality of battery cells during electrical testing;

FIG. 3 is a vertical section of an individual sleeve with a battery cell inserted therein for testing; and FIG. 4 is a horizontal section of the sleeve and battery cell, taken along line 4—4 of FIG. 3.

DETAILED DESCRIPTION OF THE INVENTION

Figure 2:
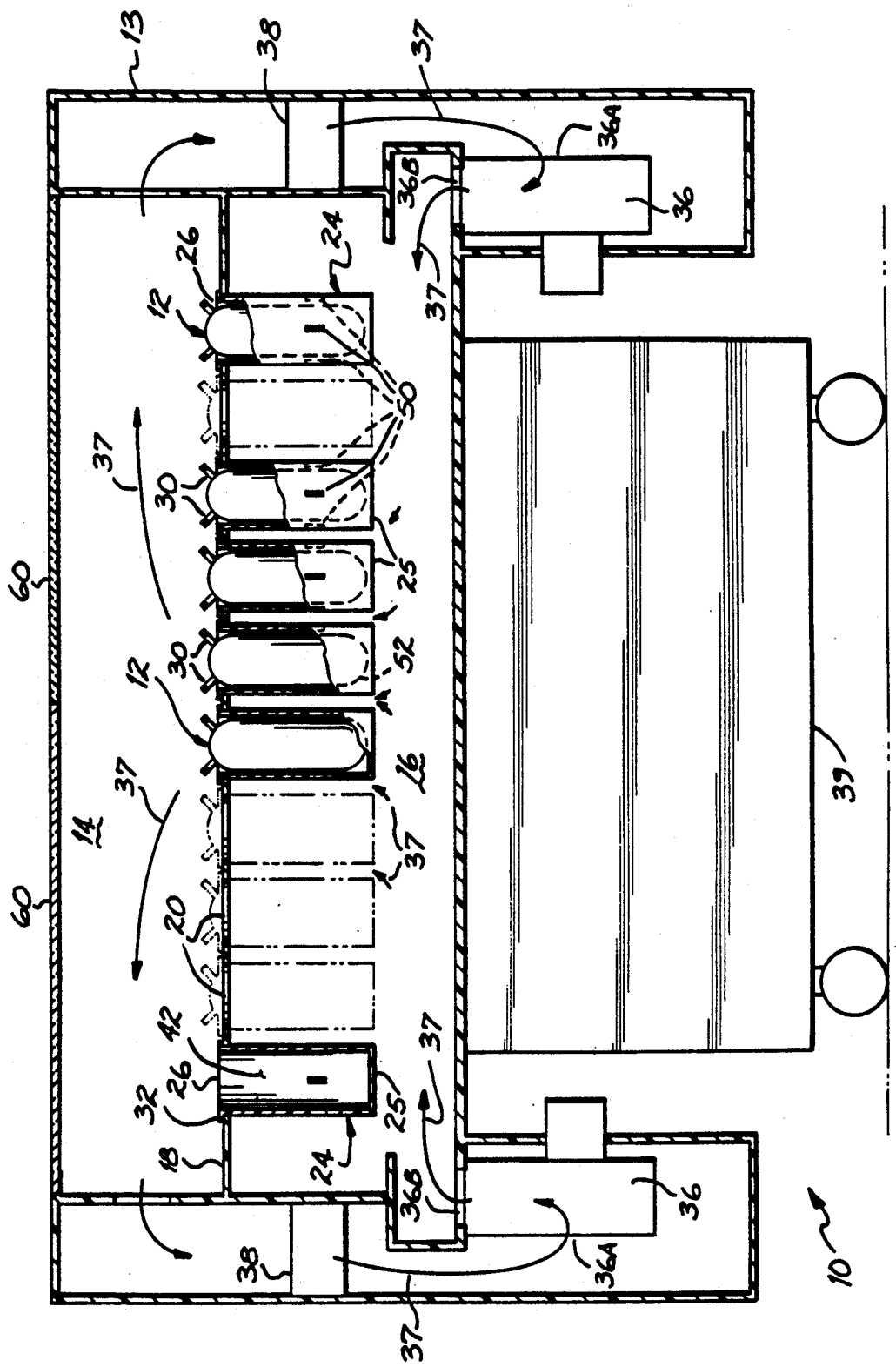
FIG. 2 is a vertical, somewhat diagrammatic cross sectional view of the test fixture of FIG. 1.

With reference to FIGS. 1 and 2, there is illustrated an apparatus or fixture 10 for cooling a large number (60 in the example shown) of test or candidate battery cells 12 during electrical testing. The battery cells shown are of the nickel-hydrogen type as shown in FIG. 3 and have a cylindrical center portion and hemispherical ends. The fixture 10 comprises a housing 13 defining an upper header or chamber 14 and a lower header or chamber 16, which are separated by a horizontal partition or bulkhead 18. The bulkhead 18 has a number of apertures 20 formed therein, with each aperture 20 sized to receive a battery cell receiving sleeve 24. Preferably the sleeve 24 is removable from the aperture 20. Each sleeve 24 is open at the upper end 26 and is preferably closed at the lower end 25 and is shaped to receive the battery cell 12. The sleeve 24 is placed in the aperture 20 so that the opening 26 is above the bulkhead 18 and opens to the upper header 14.

A candidate battery cell 12 with terminals 30 on one end can be inserted into each sleeve 24 through this opening 26. Preferably, a flange 32 is formed around the opening 26 of each sleeve 24 so the sleeve 24 can be simply dropped into each bulkhead aperture 20, with each aperture 20 being sized so that the flange 32 retains the sleeve 24 from falling through the aperture 20. The flange 32 can also be used to mount terminals 34 for electrically connecting the battery cell 12 to electrical testing equipment (not shown).

A circulation system such as one or more centrifugal electric fans 36, is provided to circulate a cooling gas (as shown by arrow 37) through the fixture 10. Each fan 36 has an intake 36A and an outlet 36B. Preferably, the motor for each fan is projects mostly outside of the housing 13 (See FIG. 2) and is separately cooled by its own fan (not shown) in order to avoid introducing additional heat and moisture into the housing. A cooling system is used to cool the circulating gas 37 having, for example, one or more Freon evaporators 38, with each evaporator 38 in combination with a compressor 39. The number of fans 36 and the refrigeration capacity of the evaporator/compressor combination 38, 39 will depend, among other things, upon the number of battery cells 12 to be cooled at any given time and the desired temperature to be reached. The specific cooling fixture 10, shown in FIGS. 1 and 2, uses four fans 36, two evaporators 38 and two compressors 39 to cool up to sixty battery cells during electrical testing. The gas 37 is circulated through each evaporator 38 by two fans 36.

Referring to FIGS. 3 and 4, each sleeve 24 has an inner surface 42 which forms a cavity 44 for containing the battery cell 12 during the low temperature electrical testing. The cavity 44 is dimensioned to provide an annular space 46 between the contained battery cell 12 and the inner surface 42. Preferably, with a cylindrical battery cell, the cavity 44 and the resulting space 46 are generally cylindrical. This annular space 46 must be of sufficient size to allow a cooling flow of the gas 37 between the battery cell 12 and the inner surface 42 in heat exchange relation with the battery cell 12. A number of bosses or studs 48 on the inner surface 42 centrally position the contained battery cell 12 within the cavity 44 to maintain the annular space 46.

A number of inlet holes, or preferably rectangular inlet slots 50 passing through the side of the sleeve 24, can be used to admit the cooling gas 37 to the space 46. Each slot 50 is slanted laterally as it passes through the sleeve 24 at an angle less than 90° relative to the surface of the battery cell 12. The cooling gas 37 admitted to the space 46 through the slots 50 is therefore directed generally laterally around the contained battery cell 12. In addition, slanting each slot 50 avoids direct impingement of the cooling gas 37 onto the surface of the battery cell 12, which has been found to effectively avoid cold spots. Optimally, each slot 50 should be slanted as near tangently as possible.

With respect to the cylindrical battery cell 12, such as a conventional nickel-hydrogen pressure vessel battery cell, each slot 50 is slanted about 45° relative to the surface of the battery cell 12, and the inner surface 42 of the sleeve 24. The angle of 45° was chosen as a compromise between ease of machining the slots 50 out of each sleeve 24 and obtaining satisfactory cooling results. Preferably, four rectangular inlet slots 50 are equally spaced transversely around the sleeve 24 and located adjacent to the closed end 25 of the sleeve 24. Most of the heat generated by such nickel-hydrogen battery cells is generated along the cylindrical portion of the battery cell 12. It has been found effective to position the slots 50 just above the lower hemispherical end 52 of battery cell 12. The longitudinal axis of each slot 50 is also preferably parallel to the longitudinal axis of the sleeve 24.

In order to avoid potential shorting of the battery cells 12, especially when testing nickel-hydrogen pressure vessel battery cells, and the like, at least the bosses 48 should be made of a dielectric material. Preferably, as much of the housing 13 as practical should be made of such a material to avoid potential shorting.

It is sometimes important to have visual access to the contained battery cells 12, as for example, if an internal pressure gauge (not shown) has been attached to battery cell 12. A transparent openable lid 60 can be provided above the upper header 14 for this purpose. Preferably, the lid 60 is segmented to facilitate opening.

In an alternative embodiment, as shown in phantom in FIG. 3, the sleeve 24 is modified to receive a battery cell 12 having a terminal 70 on each end. A hole 72 is formed through the lower (closed) end 25 of the sleeve 24 and sized to allow the passage of the end terminal 70. In the case of the cylindrical battery cell 12, like a conventional nickel-hydrogen battery cell, the lower hemispherical end 52 of the battery cell 12 can form a seal with the edge of the hole 72, or a seal can be designed appropriate to the battery cell being contained.

In operation, the fans 36 are used to circulate the gas through the evaporators 38, in combination with the compressors 39, and into the lower header 16. This circulation produces a small pressure differential between the upper header 14 and lower header 16 which in turn causes the now cooled gas 37 to enter the sleeve space 46 through the inlet slots 50, circulate around the contained battery cell 12 and toward the sleeve opening 26 and into the upper header 14. The gas 37 is warmed by contact with the battery cells. The fact that a heated gas naturally rises above a cooled gas helps the pressure differential to circulate the gas 37 toward the sleeve opening 26. After entering the upper header 14, the now warmed gas 37 is then recooled while passing through the evaporators 38 and is recirculated back into the lower header 16 by the fans 36.

Uniformity of cross sectional area of the holes or slots 50 in each sleeve 24, and the exposure of all the sleeves 24 to a common pressure in the lower header 16, establishes substantial uniformity of gas flow rate through each sleeve 24. This uniform flow rate helps to ensure that each battery cell 12 is uniformly cooled to the same temperature. Preferably, the slots 50 are dimensioned to restrict the flow of, and thereby increase the speed of, the gas 37 as it enters the space 46 and circulates around the battery cells 12. Dimensioning each slot 50 in order to restrict the flow of gas 37 by about 25% has been found to aid this uniform cooling.

An actual fixture 10 used two compressors 39, each rated at 1½ ton medium temperature, two evaporators 38, each rated at 3,300 BTUH cooling capacity, four fans 36, each having an output rating of 495 CFM, and 60 battery cell receiving sleeves 24. The nickel-hydrogen battery cells 12 tested were 9.1 inches long and 3.5 inches in diameter, with each hemispherical end having a radius of 1.75 inches. The sleeves 24 were dimensioned to form an annular space of 0.25 inches between the battery cell 12 and the inner sleeve surface 42. Each slot 50 was 1.5 inches long and 0.125 inches wide.

When the sleeve 24 has a cylindrical inner surface 42 and the battery cell 12 has a cylindrical casing, like a conventional nickel-hydrogen battery cell, the location, restrictive dimensions and slant of the inlet slots 50 in combination with the pressure differential caused by the circulating gas 37 produces a rapid spiral convection of the cooling gas 37 generally laterally around the surface of the battery cell 12. This rapid spiral convection causes uniform cooling by producing a laminar flow which tends to conform to smooth surfaces, such as the cylindrical bodies of nickel-hydrogen cells and to some extent, their hemispherical ends 52, and is effective even for long battery cells. A method for producing such a rapid spiral convection works best when a recirculating gas flow design is used, such as that shown in FIGS. 1 and 2 and described above.

The spiral motion of the gas 37 laterally around the battery cell 12 imparted by the slanted slots 50 increases the surface area of the battery cell 12 contacted per unit time by the cooling gas 37. This increase results in a better heat exchange relationship between the gas 37 and the battery cell 12 and thus better efficiency for the system. The angled flow of gas 37 has the added advantage of preventing the circulating gas 37 from directly, i.e., perpendicularly, impinging the surface of the battery cell 12 and creating a cold spot on the battery cell 12 directly adjacent to the slot 50.

It is important, especially when low temperature extremes are sought, to restrict the dew point of the cooling gas so that condensation does not occur. Such condensation could impede the gas flow or the electrical integrity of any electrical test. Such condensation can be prevented by ensuring the initial dryness of the gas 37 and the pressure integrity of the fixture 10 itself. To help prevent moisture problems, it may be desirable to maintain a small positive pressure on the system by introducing a slow flow of dry gas from an external source (not shown).

Operability tests performed on as many as 54 nickel-hydrogen battery cells at one time have indicated pronounced improvements in temperature uniformity along the length of the battery cell compared to other cooling methods. The electrical tests performed involved cycles of electrically charging and discharging the test battery cells, including the exothermic portions of the cycles (i.e., overcharging and discharging). For example, after initial activation the battery cells are run through three consecutive sealed cycles at 10° C. Each sealed cycle consisted of charging the battery cells for 16 hours and then discharging them in about 2½ hours. Following the sealed cycles, the battery cells are performance tested at 20° C., 10° C. and 0° C. In performance testing, the battery cells are consecutively charged for 16 hours and then discharged for around 2½ hours at each temperature. The battery cells are stabilized at each temperature before the new cycle is begun. Finally, the battery cells are subjected to a charge retention test which involves charging the battery cells for 16 hours at 10° C. and then holding them at this temperature under an open circuit for 24 hours.

While we have described only a limited number of embodiments of this invention, this invention is not to be limited solely to these embodiments. Persons skilled in the art will readily appreciate numerous changes and modifications which may be made without departing from the spirit of the present invention. In addition, while the present invention has been described primarily in relation to the testing of battery cells, those skilled in the art will understand that its utility also extends to batteries which comprise a plurality of cells. Therefore, we do not intend to be limited except by the scope of the following claims.

What we claim is:

1. An apparatus for heating or cooling a plurality of battery cells during electrical testing thereof, comprising:
   (a) a housing having a first chamber and a second chamber separated by a partition, said partition having a first side and a second side;
   (b) a plurality of sleeves each having an end opening located on the first side of said partition through which opening at least one battery cell can be inserted into said sleeve, an inner surface and an outer surface, said inner surface forming a cavity for containing said battery cell during electrical testing thereof, said cavity being dimensioned to provide a space between the contained battery cell and said inner surface of sufficient size to allow the passage of a gas therethrough in heat exchange relation with said battery cell, spacer means between said battery cell and said inner surface for positioning the contained battery cell within said cavity to maintain said space, and inlet means for admitting said gas to said space and for directing said gas within said space generally laterally around the contained battery cell when said gas is circulated from said inlet means to said end opening;

(c) means for circulating said gas from said inlet means, through said cavity and around the contained battery cell, and out said end opening; and (d) means for heating or cooling said gas to a desired temperature before it enters said cavity.

2. An apparatus for cooling a plurality of battery cells during electrical testing thereof, comprising:

(a) a first chamber and a second chamber separated by a bulkhead, said bulkhead having a first side and a second side;

(b) a plurality of sleeves each having an end opening located on the first side of said bulkhead through which opening at least one battery cell can be inserted into said sleeve, an inner surface and an outer surface, said inner surface forming a cavity for containing said battery cell during electrical testing thereof, said cavity being dimensioned to provide a space between the contained battery cell and said inner surface of sufficient size to allow the passage of a cooling gas therethrough in heat exchange relation with said battery cell, spacer means between said battery cell and said inner surface for positioning the contained battery cell within said cavity to maintain said space, and inlet means for admitting said cooling gas to said space and for directing said cooling gas within said space generally laterally around the contained battery cell when said cooling gas is circulated from said inlet means to said first end opening;

(c) means for circulating said gas from said second chamber, through said cavity and around the contained battery cell, into said first chamber, and back into said second chamber; and (d) means for cooling said gas before it enters said cavity.

3. The apparatus of claim 2 wherein said first chamber is positioned above said second chamber and has an openable lid.

4. The apparatus of claim 2 wherein said sleeve has a bottom and a battery cell terminal hole passes through said bottom, with means located on said bottom for sealing said battery cell terminal hole around the contained battery cell.

5. The apparatus for claim 2 wherein the contained battery cell has a trailing end with two terminals located thereon, and said trailing end is located adjacent to the end opening of said sleeve.

6. The apparatus of claim 2 wherein said spacer means comprises a plurality of bosses located on said inner surface.

7. The apparatus of claim 2 wherein at least said spacer means is made from a dielectric material.

8. The apparatus of claim 2 wherein said sleeve has a longitudinal axis and said inlet means comprises at least one rectangular slot with a longitudinal axis generally parallel to the longitudinal axis of said sleeve and said rectangular slot passes from said outer surface to said inner surface at a lateral slant, relative to the outer surface of the contained battery cell of less than 90°.

9. The apparatus of claim 8 wherein said rectangular slot is slanted 45° relative to the outer surface of the contained battery cell.

10. The apparatus of claim 2 wherein said refrigeration means includes at least one evaporator.

11. The apparatus of claim 2 wherein said circulating means includes at least one fan.

12. An apparatus for cooling a plurality of cylindrical battery cells during electrical testing thereof, comprising:

(a) an upper header and a lower header separated by a bulkhead, said bulkhead having an upper side and a lower side;

(b) a plurality of sleeves, with each of said sleeves having an end opening located on the upper side of said bulkhead through which opening at least one cylindrical battery cell can be inserted into said sleeve, an inner surface and an outer surface, said inner surface forming a cylindrical cavity for containing said cylindrical battery cell during electrical testing thereof, said cavity having a circumference dimensioned to provide a space between the contained battery cell and said inner surface of sufficient size to allow the passage of a cooling gas therethrough in heat exchange relation with said battery cell, a plurality of bosses located on said inner surface for positioning the contained battery cell within said cavity to maintain said space between the contained battery cell and said inner surface, and a plurality of rectangular inlet slots passing from said outer surface to said inner surface in such a way that a gas circulating through said inlet slot and into said cavity tends to flow laterally around the contained battery cell and towards said sleeve opening;

(c) means for circulating said gas from said lower header through said cavity and around the contained battery cell, into said upper header, and back into said lower header; and (d) means for cooling said gas before it enters said cavity.

13. The apparatus of claim 12 wherein each of said sleeves has four inlet slots which are equally spaced transversely around said sleeve.

14. The apparatus of claim 13 wherein the cross sectional area of each of said inlet slots is the same.

15. The apparatus of claim 12 wherein said sleeve has a bottom end opposite to said end opening and said inlet slot is located adjacent to said bottom end.

16. The apparatus of claim 12 wherein said rectangular slot is slanted 45° relative to the outer surface of the contained battery cell.

17. A method for maintaining a plurality of battery cells at a desired temperature during electrical testing thereof, comprising the steps of:

(a) heating or cooling a gas to a desired temperature; and (b) circulating the gas in heat exchange relation laterally around each of the battery cells in order to uniformly maintain the temperature of the battery cells being electrically tested.

18. The method of claim 17 including cooling the gas to a desired temperature below room temperature and circulating the cooled gas in heat exchange relation around each of the battery cells to produce a rapid spiral convection of the gas generally laterally around the batter cells in order to uniformly maintain the desired temperature of the battery cells being electrically tested.

19. A method for maintaining a plurality of battery cells at a desired temperature during electrical testing thereof, comprising the steps of:
  (a) inserting each battery cell into a sleeve having an inner surface such that a space is formed between the battery cell and the inner surface of the sleeve;
  (b) heating or cooling a gas to a desired temperature; and
  (c) circulating the gas through each of the spaces in heat exchange relation laterally around each of the battery cells in order to uniformly maintain the temperature of the batter cells being electrically tested.

20. The method of claim 19 including cooling the gas to a desired temperature below room temperature and circulating the gas through each of the spaces in heat exchange relation around the battery cells to produce a rapid spiral convection of the gas generally laterally around the battery cells in order to uniformly maintain the cold temperature of the battery cells being electrically tested.

* * * * *